United States Patent [19]

Stanley

[11] 3,783,196

[45] Jan. 1, 1974

[54] HIGH-DENSITY CAPACITIVE INFORMATION RECORDS AND PLAYBACK APPARATUS THEREFOR

[75] Inventor: Thomas Osborne Stanley, Princeton, N.J.

[73] Assignee: RCA Corporation, New York, N.Y.

[22] Filed: Mar. 22, 1971

[21] Appl. No.: 126,678

[52] U.S. Cl. .. 179/100.1 B, 178/6.6 A, 178/6.6 TP, 179/100.4 M, 274/38

[51] Int. Cl. ....... G11b 3/44, G11b 9/06, H04n 5/76

[58] Field of Search ............. 179/100.1 B, 100.4 M, 179/100.41 G, 100.4 C; 178/6.6 TP, 6.6 DD, 6.6 A; 96/1.1; 340/173 TP; 235/61.11 H, 61.12 R; 274/38

[56] References Cited

UNITED STATES PATENTS

| | | | |
|---|---|---|---|
| 3,654,401 | 4/1972 | Dickopp et al. | 179/100.41 L |
| 3,287,563 | 11/1966 | Clunis | 178/6.6 TP |
| 3,479,491 | 11/1969 | Levine | 235/61.11 H |
| 3,165,580 | 1/1965 | Camaras | 179/100.1 B |
| 3,569,636 | 3/1971 | Schuller | 179/100.4 M |
| 1,590,399 | 6/1926 | Tykocinski-Tykociner | 179/100.1 B |
| 3,378,645 | 4/1968 | Heller | 179/100.1 B |
| 2,422,140 | 6/1947 | Sinnett | 179/100.1 B |

FOREIGN PATENTS OR APPLICATIONS

| | | | |
|---|---|---|---|
| 153,300 | 2/1922 | Great Britain | 179/100.1 B |

OTHER PUBLICATIONS

World Premiere Video Disk, 6/24/70, pp. 19–20, and Associated Figures

*Primary Examiner*—Raymond F. Cardillo, Jr.
*Attorney*—E. M. Whitacre

[57] ABSTRACT

A high-density information record comprises a stamped thermoplastic (e.g., vinyl) disc having a constant-width spiral surface groove, the center-to-center spacing of successive closely spaced convolutions of the groove spiral being substantially constant and independent of the recorded information. The recorded information appears as an information track constituting variations in the geometry of the groove bottom along its length. Playback apparatus employs a stylus having a tip conformed to be received in the disc groove in engagement with smoothly curved side walls of groove. As a disc-supporting turntable rotates, the stylus rides in the groove passing over successive dimension-varying information track elements in the groove bottom, which serve to vary the capacitance presented between a conductive electrode incorporated in the stylus tip and a reference conductor (e.g., a conductive surface of the disc-supporting turntable). The capacitance variations occurring during playback are translated into electrical signal variations by appropriate circuitry. Per illustrative embodiment, inexpensively replicated video disc of appreciable playing time is subject to playback by above-described techniques.

20 Claims, 4 Drawing Figures

INVENTOR.
THOMAS O. STANLEY
BY H.W. Reick
ATTORNEY

INVENTOR.
THOMAS O. STANLEY
BY H.W. Reick
ATTORNEY

HIGH-DENSITY CAPACITIVE INFORMATION RECORDS AND PLAYBACK APPARATUS THEREFOR

The present invention relates generally to novel high-density information records and playback apparatus therefor, and, particularly, to such articles in novel forms providing for cooperative establishment and employment of capacitance variation effects, and readily permitting, for example, relatively inexpensive mass replication and relatively simple playback of video signal recordings of appreciable playing time.

The recovery of recorded information, by use of capacitance variations established through cooperation of a recording with a pickup electrode of associated playback apparatus, has been proposed in the past for low-density recordings, as exemplified by the disclosures of the following U.S. Pats. Nos. relating to sound recording systems: 1,580,112; 1,715,863; 1,859,551; 1,891,780; 2,373,273; and 2,442,140.

In accordance with the present invention, it is recognized that such cooperative capacitance varying phenomena may be used to advantage to achieve a high-density information record, whereby, for example, a video signal recording of appreciable playing time may be realized in a relatively inexpensive form subject to relatively simple playback techniques.

In accordance with such an embodiment of the invention, a video signal recording takes the form of a spirally grooved disc subject to playback by apparatus employing a pickup stylus riding in the disc groove. An information track in the bottom of the groove is provided with dimensions varying in accordance with recorded information. The instantaneous location of the center of the groove is not varied in accordance with recorded information; rather, the center-to-center spacing of successive convolutions of the spiral is substantially constant, whereby close spacing of the successive convolutions may be achieved. The stylus tip is conformed to be received within the disc groove in engagement with smoothly curved side walls of the groove, which is of substantially constant width throughout its length. As the groove is moved relative to the stylus during playback (e.g., by rotation of a disc supporting turntable), the stylus rides in the groove passing over the successive dimension-varying information track elements in the groove bottom. These elements do not mechanically affect the stylus but rather serve to vary capacitance presented between a conductive electrode incorporated in the stylus tip and a reference conductor (e.g., a conductive surface of the disc supporting turntable).

Electrical circuitry incorporating the varying capacitance serves to translate the capacitance variations occurring during playback into electrical signal variations which may be suitably employed to effect visual display of the recorded information. Illustratively, the electrical circuitry may comprise a resonant circuit incorporating the record-varying capacitance, and subject to RF excitation at a frequency suitably higher than the recorded signal frequencies, and further comprising means for detecting the resulting variations in response to such RF excitation.

Pursuant to the principles of the present invention, the pickup stylus desirably incorporates: (a), a conductive electrode presenting to the groove bottom during playback a surface area of quite minute dimensions, the electrode dimension in a direction transverse to the groove being of the order of the track width, while the electrode dimension along the groove is an appreciably smaller value appropriate to resolution of recorded high frequency video variations; and (b), an insulating support for the conductive electrode of appreciably greater dimensions, suitably conformed to provide the desired groove wall engagement and establishing the requisite mechanical properties of the assembly.

Illustratively, the disc comprises a thermoplastic material, such as vinyl (as used in audio phonograph records), whereby the grooving of such material and the formation of the dimension-varying information track therein may be effected by mass replication techniques akin to the record stamping operations associated with the audio phonograph record industry.

An illustrative dimension variation pattern, that may be employed to vary the geometry of the groove bottom, is the relative raising and/or depression of the thermoplastic material in the groove bottom in accordance with the recorded information. With the dielectric constant of the thermoplastic disc material greater than that of air, the capacitance presented between the stylus electrode surface and the reference conductor (e.g., turntable) during playback will be greater when the stylus electrode surface is positioned over a relatively raised area in the groove bottom than when the stylus electrode surface is positioned over a relatively depressed area. Thus, as relative motion between the groove and stylus occurs, the successive alignments of the stylus electrode with differently raised and/or lowered regions in the groove results in a succession of capacitance variations representative of the recorded information.

An object of the present invention is to provide a novel high-density information record and playback apparatus therefor.

Other objects and advantages of the present invention will be readily recognized by those skilled in the art upon a reading of the following detailed description and an inspection of the accompanying drawings, in which.

Figure 2:
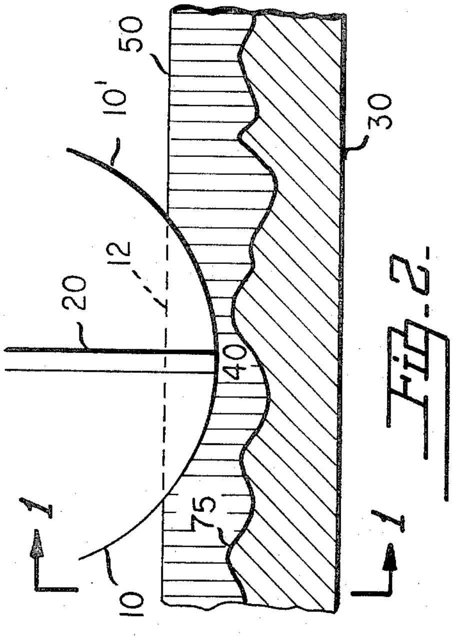
FIG. 2 is a longitudinal sectional view of the record groove of FIG. 1, with a further view of the stylus tip in playback engagement therewith.
Figure 1:
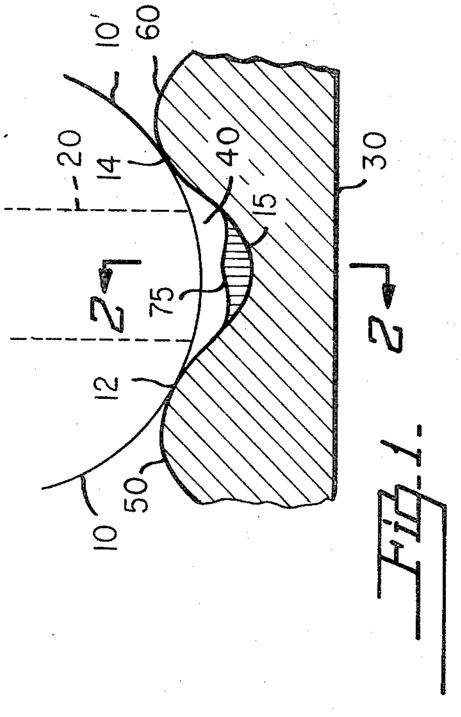
FIG. 1 is a transverse sectional view of a disc recording, showing the engagement during playback thereof of a stylus tip with the walls of a disc groove containing an information track in the groove bottom, and illustrating an application of the principles of the present invention.
Figure 3:
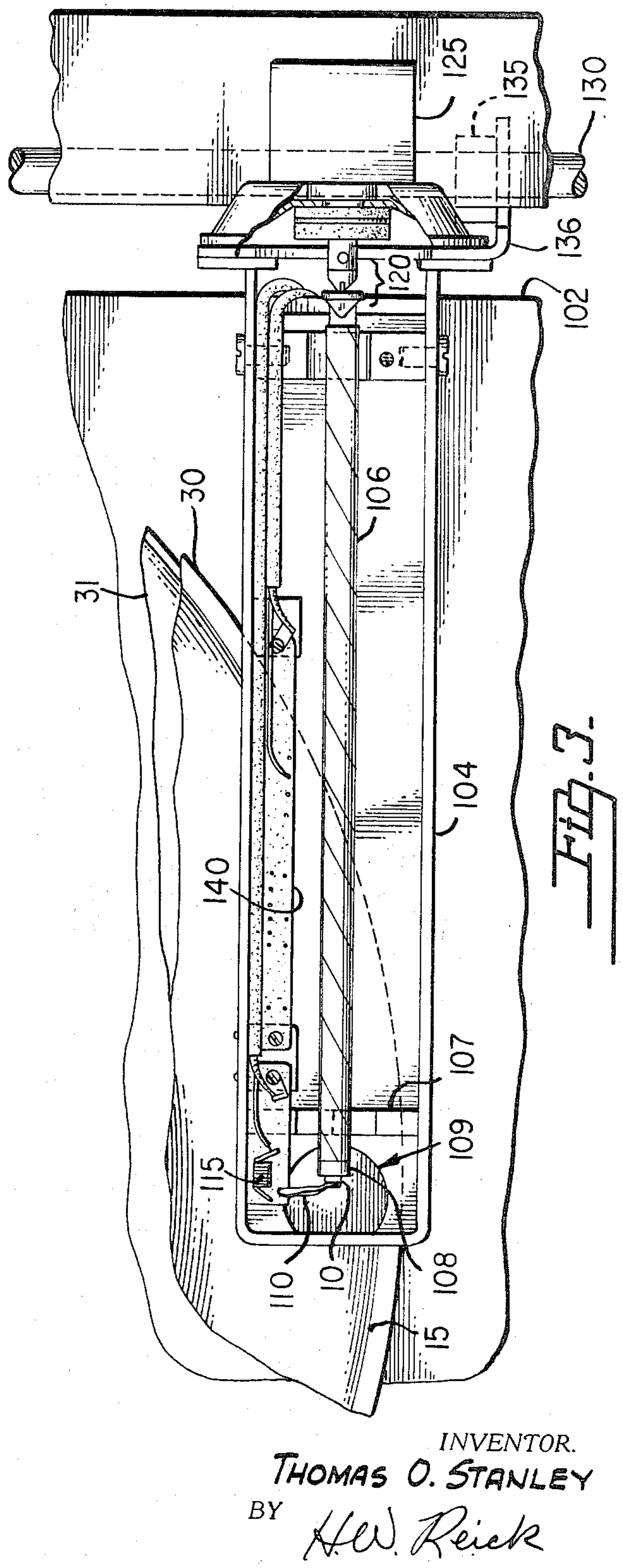
Figure 4:
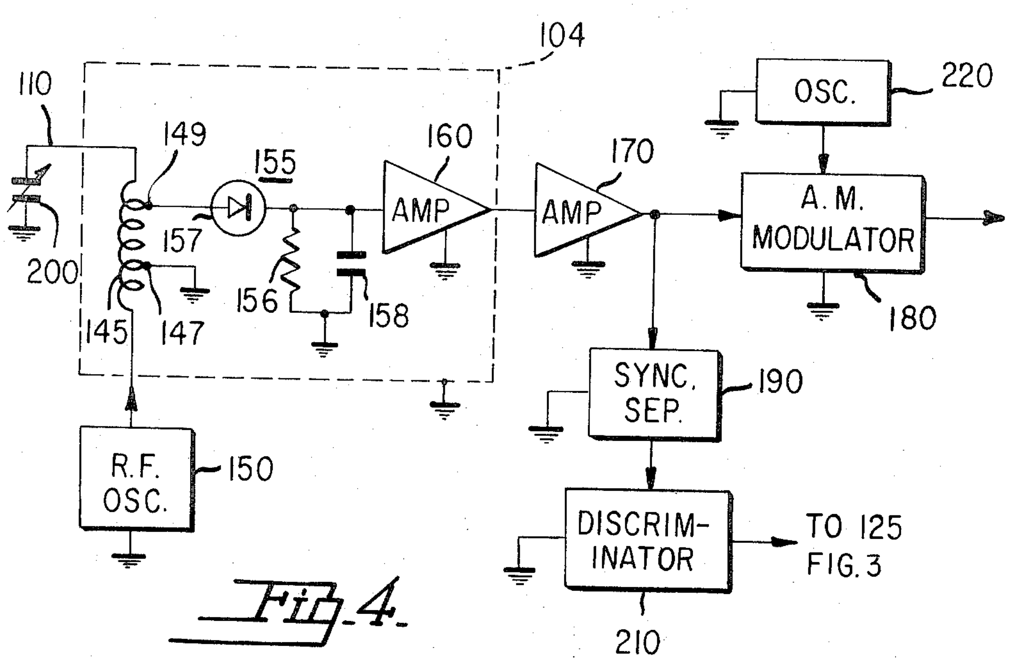

FIG. 3 is a top view of illustrative playback apparatus that may be employed in association with the stylus and disc recording of FIGS. 1 and 2 pursuant to the principles of the present invention; and FIG. 4 is a diagram, partially in schematic and partially in block form, depicting illustrative electrical circuitry that may be employed to process capacitance variations occurring with relative motion between stylus and groove during operation of the FIG. 3 apparatus pursuant to the principles of the present invention.

In FIG. 1, the tip of a pickup stylus 10, including an embedded conductive element 20, is shown riding in a groove 15 in a recording medium 30 (illustratively, a portion of a spirally grooved disc). The relative motion of the groove 15 with respect to the stylus 10 during playback is perpendicular to the plane of the drawing.

It is seen that the stylus tip is supported by the side walls 12 and 14 of the groove 15; lands 50 and 60, respectively, form the boundaries for the illustrated groove segment, separating it from adjacent groove convolutions. Electrode 20 is aligned to be centered above an information track 75 in the bottom of the groove 15.

Pursuant to an illustrative example of groove bottom geometry modification, the information track 75 may comprise variations in the height of the groove bottom along the length of the groove 15 (as best shown in the longitudinal sectional view of FIG. 2) with the consequence of complementary variations in the magnitude of an air gap 40 between the electrode 20 and the track 75. The illustrated width of the electrode 20 (FIG. 1) is substantially coincident with the width of the information track 75 in the groove 15. The thickness (FIG. 2) of the electrode 20 at the exposed tip is of a still smaller magnitude appropriate to resolution of the smallest required information track variation.

As FIG. 2 shows, the stylus 10 is supported by the groove side walls in such manner that passage of the elements of information track 75 beneath the tip of stylus 10 will desirably impart no mechanical disturbance to the stylus. What will occur, however, during such passage of the track elements, that may be utilized in recorded information recovery, is a variation in the capacitance presented between the electrode 20 and a reference conductive area, positioned, for example, beneath the disc 30. Illustratively, the reference conductor may comprise a conductive surface of a turntable provided to support and rotate disc 30.

Illustrative dimensions for the stylus electrode 20 and the spiral disc groove 15 are the following: electrode 20 width-5 micrometers; electrode 20 thickness-1 micrometer; groove pitch-2,000 grooves per inch. Associating such dimensions with an illustrative disc rotation speed of 600 rpm, one may obtain, for example, recovery of signal frequencies up to about 4 megacycles, with a one-side playing time of approximately 10 minutes, from a 12 ½ inch diameter disc having the highest frequency variation occupying 2.5 micrometers of groove length per variation wavelength.

Other parameter combinations may, of course, be employed, where, for example, a lower disc rotation speed is desired.

In a copending application of Jon K. Clemens, Ser. No. 126,772 filed concurrently herewith on Mar. 22, 1971 and entitled "Information Records and Recording/Playback Systems Therefor," modifications and improvements of the herein described record and playback arrangements are described in detail. Reference may be made thereto for examples of record cutting techniques that may be adapted to development of a stamping master suitable for mass replication of the disc 30; see, particularly, the master preparation process associated with FIGS. 9A through 9F of the Clemens application, and the description of scanning electron microscope processes for recording of groove bottom information tracks. Reference may also be made to the Clemens application for an example of procedures that may be followed in forming stylus 10.

FIG. 3 is a top view of record player mechanism which may, illustratively, be employed in playback of the disc 30 of FIGS. 1 and 2. The mechanism includes a turntable mounting board 102 which has a drive motor and drive mechanism (not shown) for rotating a disc-supporting turntable 31 (only partially shown). A shield enclosure 104 includes a stylus arm 106, which rests on a stylus arm centering bracket 107 when the machine is not operating. The stylus 10 is attached to the stylus arm 106 by means of a stylus mounting cap 108. An aperture 109 in shield enclosure 104 permits stylus 10 to pass through the enclosure and contact disc 30. The electrical connection to the electrode imbedded in the stylus is made by means of a flexible conductor 110, which may be fabricated by beryllium copper, for example. The stylus arm 106 is attached to a groove velocity error drive mechanism 125 by means of a flexible pivot assembly 102 which allows the stylus arm 106 to move in a lateral as well as vertical direction during operation. The flexible pivot assembly 120 is described in detail in a concurrently filed application of Marvin A. Leedom, Ser. No. 126,677, filed Mar. 22, 1971 entitled "Stylus Arm Pivot," and assigned to the present assignee.

The shield enclosure 104 and stylus arm 106 are driven to allow the stylus 10 to track the groove 15 by means of a drive shaft 130 which is engaged by an engaging mechanism 135 coupled to the shield enclosure 104 by means of a shield enclosure bracket 136. The drive shaft 130 may be coupled to the drive mechanism in the manner described in detail in the aforementioned copending Clemens application.

In operation, the shield enclosure 104 including the stylus arm 106 is moved across the record by means of the drive shaft 130 to provide tracking with the groove 15. The flexible pivot 120 as well as the flexible conductor 110 allows the stylus arm 106 to float on the disc 30, thereby permitting the stylus 10 to track surface deviations in the disc such as warping. The groove velocity error drive mechanism 125 is driven by signals from the circuitry shown in FIG. 4 (to be subsequently described) to compensate for velocity errors due to turntable speed variations, record eccentricity, or other velocity errors. The operation of the mechanism 125 is described in detail in a concurrently filed application of Richard C. Palmer, Ser. No. 126,797, filed Mar. 22, 1971 entitled "Velocity Adjusting System," and assigned to the present assignee. It is noted that the stylus arm 106, the shield enclosure 104, and the drive mechanism 130–136 can be replaced in some applications with a relatively long lightweight pickup arm which can pivot on the turntable base in much the same manner as an audio pickup arm.

The shield enclosure 104 may also house some of the electrical circuits of FIG. 4. For example, an inductor 145 to which the element 20 is coupled, can be mounted on a circuit board 140. Other circuit components can be mounted on circuit board 140 without affecting the tracking weight of the stylus 10, since the stylus arm 106 is free floating and independent of the shield enclosure 104. A typical tracking weight on the stylus is less than one gram.

FIG. 4 is a schematic circuit diagram, partially in block form, of illustrative electrical circuitry that may be employed to process the capacitance variations, occurring between the element 20 and a reference conductor during playback of disc 30, to produce useful output signals. The circuit may be used, for example, to provide an amplitude modulated carrier signal which is applied to the antenna terminals of a television receiver for producing a television display.

In FIG. 4, variable capacitor 200 represents the capacitance between the stylus electrode 20 and the reference conductor (illustratively, the conductive turntable 31 suitably grounded) during playback of disc 30. The element 20 is coupled to an inductor 145 by means of the electrical conductor 110 (also shown in FIG. 3). A peak detector circuit 155 is coupled to a tap 149 on inductor 145. Circuit 155 comprises a diode 157, and the parallel combination of a resistor 156 and a capacitor 158 coupled between a terminal on the diode (remote from its connection to inductor 145) and ground. Capacitor 158, shown as a lumped parameter, may simply comprise the sum of the stray capacitance of the leads and the input capacitance of the pre-amplifier 160. A second tap 147 on inductor 145 is coupled to ground.

An RF oscillator 150 applies radio frequency signals to inductor 145. A pre-amplifier 160 is coupled to the peak detector circuit 155 and provides amplified video signals at its output.

Circuit elements 145, 155 and 160 may be mounted in the shield enclosure 104, advantageously placing the components in proximity with the pickup electrode in order to reduce stray reactances. This is indicated in the drawing by the dashed lines surrounding these circuit components. The output of pre-amplifier 160 is coupled to an amplifier 170 which further amplifies the detected signals. The output of amplifier 170 is coupled to an A.M. modulator 180 and to a sync separator circuit 190. The output of the sync separator circuit 190 is coupled to a discriminator circuit 210. The output of the discriminator circuit 210 is coupled to the groove velocity correction circuit 125 shown in FIG. 3. An oscillator circuit 220 produces a carrier signal which is applied to the A.M. modulator 180, and is modulated by the signal information from amplifier 170. The amplitude modulated carrier from modulator circuit 180 may be applied, for example, to the antenna terminals of a television receiver.

In operation, the RF oscillator 150 provides an excitation voltage to a resonant circuit which comprises the capacitor 200, the inductor 145, the junction capacitance of diode 157 and the stray capacitance 158. The inductor segment between the RF oscillator 150 and terminal 147 operates as an auto-transformer to couple the RF excitation signal to the resonant circuit. As the resonant frequency of the circuit is varied due to variations of capacitance 200, the amplitude of the excitation voltage at the input of the diode varies. The Q of the resonant circuit is chosen to yield a sufficiently sharp voltage versus frequency curve to provide adequate signal amplitude variations at tap 149 of inductor 145 for detection by peak detector 155. The Q should be chosen, however, such that the resonant circuit simultaneously exhibits adequate bandwidth. The frequency of oscillator 150 is desirably chosen such that it falls on one side of the frequency response curve of the resonant circuit and, as the resonance frequency of the resonant circuit changes due to signal information, will remain on that slope of the shifting frequency response of the resonant circuit during all signal conditions. As the element 20 tracks in groove 15, capacitance 200 varies in accordance with the recorded information. The varying capacitance shifts the resonant frequency of the tuned circuit. Since a constant frequency bias signal (from oscillator 150) is being applied to the circuit, as the resonant frequency varies, the response of the circuit to the bias frequency changes as a function of the recorded information, thereby providing an amplitude modulated output signal at terminal 149. Peak detector 155 detects these amplitude variations by means of diode 157, and the filter network comprising capacitor 158 removes the frequency components above the frequency of the signal information.

The signals from detector 155 are coupled to preamplifier 160 which may also be mounted in the shield enclosure 104 to reduce noise interference with the signal. The output signal from amplifier 160 is then applied to a second amplifier 170 for further amplification. A sync separator circuit 190 separates the horizontal synchronization pulses from the composite signal output of amplifier 170 and couples them to a discriminator circuit 210. The discriminator is designed to provide a control voltage when the synchronization signals from separator 190 vary from the nominal horizontal sync rate due to groove velocity changes. Thus, it is seen that the synchronization signal frequency provides a pilot tone recorded on the disc which can be detected by discriminator 210 to provide a control voltage indicating when the recorded sync signal frequency deviates from its proper value due to relative groove velocity error. The control signal from discriminator 210 is applied to the mechanism 125 of FIG. 3 to provide a corrective longitudinal motion to the stylus arm 106 in a direction to tend to cancel the relative groove velocity error. The operation of such a groove velocity corrector and detector circuit is explained in greater detail in the aforementioned copending Palmer application.

The composite signal from amplifier 170 is also, illustratively, applied to an amplitude modulator circuit 180. Oscillator 220 has a frequency chosen to coincide with one of the UHF or VHF channels of a television receiver and supplies a carrier wave to the modulator which is amplitude modulated by the video and synchronization signals from amplifier 170. The amplitude modulated signal from stage 180 may be coupled directly to the antenna terminals of a standard television receiver, so that the latter may effect a display of the recorded video signals.

What is claimed is:

1. A high-density information record playback system comprising:

a disc record having a constant-width spiral groove in a surface thereof, the center-to-center spacing of successive convolutions thereof being substantially constant and independent of recorded information;

said groove containing an information track constituted by variations in the geometry of the bottom of the groove representative of recorded information, and having sidewalls of a configuration which is substantially constant throughout said successive convolutions and independent of the groove bottom geometry variations representative of recorded information;

a stylus having a tip subject to reception in said disc groove during playback use;

said stylus including a support of insulating material, and an electrode of conductive material secured to said insulating support, said electrode presenting a surface of the disc groove bottom when said tip is received in said disc groove, which surface has a greater dimension in a lateral direction extending between said groove sidewalls and a lesser dimension in a longitudinal direction along said groove and normal to said lateral direction;

a turntable for supporting said disc in a playing position permitting said disc groove reception of said stylus tip;

means for rotating said turntable to establish relative motion between said disc groove and said stylus tip;

and means electrically connected to said stylus electrode for developing an electrical signal representative of groove bottom geometry variations passing beneath said stylus electrode surface when said relative motion occurs.

2. A video signal record playback system comprising:

a disc record having a constant-width spiral groove in the surface thereof, the center-to-center spacing of successive convolutions thereof being substantially constant and independent of recorded information;

said groove containing an information track constituted by variations in the geometry of the bottom of the groove representative of video signal information, and having sidewalls of a configuration which is substantially constant throughout said successive convolutions and independent of the groove bottom geometry variations representative of recorded video signal information;

a stylus having a tip subject to reception in said disc groove during playback use;

said stylus including a support of insulating material, and an electrode of conductive material secured to said insulating support, said electrode presenting a surface to the disc groove bottom when said tip is received in said disc groove, which surface has a greater dimension in a lateral direction extending between said groove sidewalls and a lesser dimension in a longitudinal direction along said groove and normal to said lateral direction;

a turntable for supporting said disc in a playing position permitting said disc groove reception of said stylus tip;

means for rotating said turntable to establish relative motion between said disc groove and said stylus tip;

and means electrically connected to said stylus electrode for developing an electrical signal representative of groove bottom geometry variations passing beneath said stylus electrode surface when said relative motion occurs.

3. A grooved high-density information record playback system comprising:

a disc record having a spiral groove in a surface thereof of a substantially constant width independent of recorded information, the center-to-center spacing of successive convolutions thereof being substantially constant and independent of recorded information;

said groove containing an information track constituted by variations in the geometry of the bottom of the groove representative of recorded information, and having sidewalls of a configuration which is substantially constant throughout said successive convolutions and independent of the groove bottom geometry variations representative of recorded information;

a stylus having a tip subject to reception in said disc groove during playback use;

said stylus including a support of insulating material, and an electrode of conductive material secured to said insulating support, said electrode presenting a surface to the disc groove bottom when said tip is received in said disc groove, which surface has a greater dimension in a lateral direction extending between said groove sidewalls and a lesser dimension in a longitudinal direction along said groove and normal to said lateral direction;

the substantially constant configuration of said groove sidewalls limiting the depth of stylus tip entry in said groove to a dimension which is substantially constant throughout said successive convolutions and independent of the contents of said information track;

a turntable for supporting said disc in a playing position permitting said disc groove reception of said stylus tip;

means for rotating said turntable to establish relative motion between said disc groove and said stylus tip;

and means electrically connected to said stylus electrode for developing an electrical signal representative of groove bottom depth variations passing beneath said stylus electrode surface when said relative motion occurs.

4. A stylus, for use in playback of a grooved disc recording, said stylus comprising:

a support of insulating material providing the tip of said stylus with insulating sidewalls dimensioned for disc groove sidewall engagement;

and a conductive electrode, affixed to said insulating support in a location substantially centered with respect to said insulating sidewalls, and having a surface exposed at the bottom of said stylus tip, said conductive electrode having a lateral dimension, in a direction extending between said insulating sidewalls, which is foreshortened relative to the distance between said insulating sidewalls to a degree precluding disc groove sidewall engagement by said conductive electrode.

5. A stylus, for use in playback of a grooved disc recording, said stylus comprising:

a stylus tip having insulating sidewalls for disc groove sidewall engagement, said insulating sidewalls being constituted by opposite edges of a support element of insulating material;

and a conductive electrode, embedded within said insulating support element, and having a surface exposed at the bottom of said stylus tip, said conductive electrode having a lateral dimension, in a direction extending between said insulating sidewalls, which is foreshortened relative to the distance between said insulating sidewalls whereby disc groove sidewall engagement of said conductive electrode is precluded.

6. A stylus, for use in playback of a grooved disc recording, said stylus comprising:

a stylus tip having insulating sidewalls for disc groove sidewall engagement, said insulating sidewalls being constituted by opposite edges of a support element of insulating material;

and a conductive electrode, affixed to said insulating support element, said conductive electrode having a lateral dimension, in a direction extending between said insulating sidewalls, which is foreshortened relative to the distance between said insulating sidewalls whereby disc groove sidewall engagement by said conductive electrode is precluded, said conductive electrode terminating in a surface at the bottom of said stylus tip having a greater dimension in said lateral direction extending between said stylus sidewalls and a lesser dimension in a direction transverse to said lateral direction.

7. A stylus, for use in playback of a grooved disc recording, said stylus comprising:

a support of insulating material providing the tip of said stylus with insulating sidewalls, the spacing therebetween being such as to permit disc groove sidewall engagement of said insulating sidewalls in said playback use;

and a conductive electrode, secured to said insulating support in a location substantially centered with respect to said insulating sidewalls, and having a surface exposed at the bottom of said stylus tip, said conductive electrode having a lateral dimension, in a direction extending between said insulating sidewalls, which is foreshortened relative to the distance between said insulating sidewalls whereby disc groove sidewall engagement by said conductive electrode is precluded, said electrode terminating at the bottom of said stylus tip in said exposed surface which has a greater dimension in said lateral direction extending between said stylus sidewalls and a lesser dimension in a direction transverse to said lateral direction.

8. In combination:

a high-density information record disc of thermoplastic material;

said disc having a constant-width spiral groove in a surface thereof, the center-to-center spacing of successive convolutions thereof being substantially constant and independent of recorded information;

said groove containing an information track constituted by variations in the geometry of the bottom of the groove representative of recorded information, and having sidewalls of a configuration which is substantially constant throughout said successive convolutions and independent of the groove bottom geometry variation representative of recorded information;

a stylus having a tip subject to reception in said disc groove;

said stylus including a support of insulating material providing the tip of said stylus with insulating sidewalls for disc groove sidewall engagement when said tip is received in said disc groove, and a conductive electrode, affixed to said insulating support in a location substantially centered with respect to said insulating sidewalls, and presenting a surface to the bottom of said stylus tip, said conductive electrode having a lateral dimension in a direction extending between said insulating sidewalls, which is sufficiently foreshortened relative to the distance between said insulating sidewalls to preclude disc groove sidewall engagement by said conductive electrode when said stylus tip is received in said disc groove;

means for establishing relative motion between said disc groove and said stylus tip under conditions of reception of said stylus tip within said disc groove;

conductive means in proximity to said information track; and means responsive to capacitance variations exhibited between said stylus electrode and said conductive means during said motion for providing an electrical signal representative of said recorded information.

9. A high-density information record playback system comprising the combination of:

a disc of thermoplastic material;

said disc having a constant-width spiral groove in a surface thereof, the center-to-center spacing of successive convolutions thereof being substantially constant and independent of recorded information;

said groove containing an information track constituted by variations in the geometry of the bottom of the groove representative of recorded information, and having sidewalls of a configuration which is substantially constant throughout said successive convolutions and independent of the groove bottom geometry variation representative of recorded information;

a stylus having a tip subject to reception in said disc groove;

said stylus including a support of insulating material providing the tip of said stylus with insulating sidewalls for disc groove sidewall engagement when said tip is received in said disc groove, and a conductive electrode, affixed to said insulating support in a location substantially centered with respect to said insulating sidewalls, and presenting a surface to the bottom of said stylus tip, said conductive electrode having a lateral dimension in a direction extending between said insulating sidewalls, which is sufficiently foreshortened relative to the distance between said insulating sidewalls to preclude disc groove sidewall engagement by said conductive electrode when said stylus tip is received in said disc groove;

means for establishing relative motion between said disc groove and said stylus under conditions of substantially constant-depth reception of said stylus tip within said disc groove;

conductive means in proximity to said information track;

a resonant circuit incorporating the capacitance exhibited between said stylus electrode surface and said conductive means;

a source of oscillations;

means for applying oscillations from said source to said resonant circuit; and means including an amplitude detector coupled to said resonant circuit for developing a signal representative of said recorded information as said capacitance varies during said motion.

10. A high-density information record playback system comprising the combination of:

a disc of thermoplastic insulating material;

said disc having a constant-width spiral groove in a surface thereof, the center-to-center spacing of successive convolutions thereof being substantially constant and independent of recorded information;

said groove containing an information track constituted by variations in the geometry of the bottom of the groove below groove sidewalls of substantially invariant geometry;

a stylus, including a support of insulating material providing the tip of said stylus with insulating sidewalls for disc groove sidewall engagement, and a conductive electrode, secured to said insulating support, said conductive electrode having a lateral dimension in a direction extending between said insulating sidewalls, which is sufficiently foreshortened relative to the distance between said insulating sidewalls to preclude disc groove sidewall engagement by said conductive electrode when said stylus tip is received in said disc groove and having a surface exposed at the bottom of said stylus tip, said electrode surface having a greater dimension in said lateral direction extending between said stylus sidewalls and a lesser dimension in a direction transverse to said lateral direction;

means for establishing relative motion between said disc groove and said stylus tip under conditions of substantially constant-depth reception of said stylus tip within said disc groove, said motion establishing means including a disc-supporting turntable having a conductive surface; and means responsive to capacitance variations exhibited between said stylus electrode surface and said conductive turntable surface during said motion for providing an electrical signal representative of recorded information.

11. Apparatus in accordance with claim 10 wherein said information track comprises a succession of relatively raised and relatively lowered regions of said insulating material along the length of said groove bottom, the relative dimensioning of said stylus sidewalls and said disc groove sidewalls and the dimensioning of said information track being such as to substantially preclude mechanical disturbance of said stylus tip by said groove bottom regions during said motion.

12. Playback apparatus, for use with a grooved video disc, comprising the combination of:

a stylus including a tip having insulating sidewalls for disc groove sidewall engagement when received in a video disc groove, said insulating sidewalls being constituted by opposite edges of a support element of insulating material;

said stylus tip also including a conductive electrode, secured to said insulating support element in a location centrally positioned with respect to said insulating sidewalls, and having a surface exposed at the bottom of said stylus tip, said conductive electrode having a lateral dimension, in a direction extending between said insulating sidewalls, which is foreshortened relative to the distance between said insulating sidewalls so as to preclude disc groove sidewall engagement by said conductive electrode when said tip is received in a video disc groove;

a turntable for supporting a video disc in a playing position permitting disc groove reception of said stylus tip;

means for rotating said turntable for establishment of relative motion between said disc groove and stylus tip;

and means electrically coupled to said stylus electrode for developing an electrical signal representative of information recorded on said video disc when said relative motion occurs.

13. Playback apparatus, for use with a grooved video disc, comprising the combination of:

a stylus including a tip having insulating sidewalls for disc groove sidewall engagement when received in a video disc groove, said insulating sidewalls being constituted by opposite edges of a support element of insulating material;

said stylus tip also including a conductive electrode, secured to said insulating support element in a location centrally positioned with respect to said insulating sidewalls, and having a surface exposed at the bottom of said stylus tip, said conductive electrode having a lateral dimension, in a direction extending between said insulating sidewalls, which is foreshortened relative to the distance between said insulating sidewalls so as to preclude disc groove sidewall engagement by said conductive electrode when said tip is received in a video disc groove;

means, including a turntable, for supporting a video disc in a playing position permitting disc groove reception of said stylus tip and for presenting a reference conductive surface in proximity to said disc when in said playing position, said turntable being rotatable to establish relative motion between disc groove and stylus tip; and means electrically coupled to said stylus electrode and to said reference conductive surface for developing signal variations when said relative motion occurs.

14. Playback apparatus, for use with a grooved video disc, comprising the combination of:

a stylus including a tip having insulating sidewalls for disc groove sidewall engagement when received in a video disc groove, said insulating sidewalls being constituted by opposite edges of a support element of insulating material;

said stylus tip also including a conductive electrode, secured to said insulating support element in a location centrally positioned with respect to said insulating sidewalls, and having a surface exposed at the bottom of said stylus tip, said conductive electrode having a lateral dimension, in a direction extending between said insulating sidewalls, which is foreshortened relative to the distance between said insulating sidewalls so as to preclude disc groove sidewall engagement by said conductive electrode when said tip is received in a video disc groove;

means, including a turntable, for supporting a video disc in a playing position permitting disc groove reception of said stylus tip and for presenting a reference conductive surface in proximity to said disc when in said playing position, said turntable being rotatable to establish relative motion between disc groove and stylus tip; and an inductive element connected between said stylus electrode and said reference conductive surface;

a source of relatively fixed-frequency oscillations coupled to said inductive element;

and means for detecting variations in the amplitude of oscillations appearing across said inductive element when said motion occurs.

15. A grooved video signal record playback system comprising:

a video disc having, in a surface thereof, a spiral groove of a width which is substantially constant and independent of recorded information, the center-to-center spacing of successive convolutions of said spiral groove being independent of recorded information;

said groove containing an information track constituted by variations in the geometry of the bottom of the groove representative of recorded video information, and having sidewalls of a configuration which is substantially constant throughout said successive convolutions and independent of the groove bottom geometry variations representative of recorded information;

a stylus having a tip subject to reception in said disc groove during playback use;

said stylus including a support of insulating material, and an electrode of conductive material secured to said insulating support, said electrode presenting a surface to the disc groove bottom when said tip is received in said disc groove, which surface has a greater dimension in a lateral direction extending between said groove sidewalls and a lesser dimension in a longitudinal direction along said groove and normal to said lateral direction;

the substantially constant configuration of said groove sidewalls limiting the magnitude of attainable depth of stylus tip reception in said groove to a value which is the same for all regions of said groove throughout said successive convolutions and which is independent of the contents of said information track;

a turntable for supporting said disc in a playing position permitting said disc groove reception of said stylus tip;

means for rotating said turntable to establish relative motion between said disc groove and said stylus tip;

and means electrically connected to said stylus electrode for developing an electrical signal representative of groove bottom geometry variations passing beneath said stylus electrode surface when said relative motion occurs.

16. A grooved video signal record playback system comprising:

a video disc record of thermoplastic material;

said disc record having, in a surface thereof, a spiral groove of a width which is substantially constant and independent of recorded information, the center-to-center spacing of successive convolutions of said spiral groove being independent of recorded information;

said groove containing an information track constituted by variations in the geometry of the bottom of the groove representative of recorded video information, and having sidewalls of a configuration which is substantially constant throughout said successive convolutions and independent of the groove bottom geometry variations representative of recorded information;

a stylus having a tip subject to reception in said disc groove during playback use;

said stylus including a support of insulating material, and an electrode of conductive material secured to said insulating support, said electrode presenting a surface to the disc groove bottom when said tip is received in said disc groove, which surface has a greater dimension in a lateral direction extending between said groove sidewalls and a lesser dimension in a longitudinal direction along said groove and normal to said lateral direction;

the substantially constant configuration of said groove sidewalls limiting the magnitude of attainable depth of stylus tip reception in said groove to a value which is the same for all regions of said groove throughout said successive convolutions and which is indepenent of the contents of said information track;

said groove bottom geometry variations in the groove of said thermoplastic disc comprising variations in the depth of said groove in a region centrally disposed relative to said sidewalls, said depth variations being limited to a range of depths exceeding said magnitude of attainable depth of stylus tip reception;

a turntable for supporting said disc in a playing position permitting said disc groove reception of said stylus tip;

means for establishing relative motion between said disc groove and said stylus tip under conditions of substantially constant depth reception of said stylus tip within said disc groove, said motion establishing means comprising means for rotating said disc-supporting turntable;

and means electrically connected to said stylus electrode for developing an electrical signal representative of groove bottom depth variations passing beneath said stylus electrode surface when said relative motion occurs.

17. A stylus, for use in playback of a grooved disc recording, said stylus comprising:

a support of insulating material providing the tip of said stylus with insulating sidewalls, the spacing therebetween being such as to permit disc groove sidewall engagement by said insulating sidewalls in said playback use;

and a conductive electrode, secured to said insulating support in a location substantially centered with respect to said insulating sidewalls, and having a surface exposed at the bottom of said stylus tip, said conductive electrode having a lateral dimension, in a direction extending between said insulating sidewalls, which is reduced relative to the distance between said insulating sidewalls whereby disc groove sidewall engagement by said conductive electrode is precluded, said electrode terminating at the bottom of said stylus tip in said exposed surface which has a greater dimension in said lateral direction extending between said stylus sidewalls and a lesser dimension in a direction transverse to said lateral direction, said lesser dimension being of the order of one micrometer.

18. In combination:

a disc of thermoplastic material;

said disc having, in a surface thereof, a spiral groove of a width which is substantially constant and independent of recorded information, the center-to-center spacing of successive convolutions of said spiral groove being independent of recorded information;

said groove containing an information track constituted by variations in the geometry of the bottom of the groove representative of recorded information, and having sidewalls of a configuration which is substantially constant throughout said successive convolutions and independent of the groove bottom geometry variation representative of recorded information;

a stylus having a tip subject to reception in said disc groove;

said stylus including a support of insulating material providing the tip of said stylus with insulating sidewalls dimensioned for disc groove sidewall engagement, and a conductive electrode, affixed to said insulating support in a location substantially centered with respect to said insulating sidewalls, and having a surface exposed at the bottom of said stylus tip, said conductive electrode having a lateral dimension, in a direction extending between said insulating sidewalls, which is reduced relative to the distance between said insulating sidewalls to a degree precluding disc groove sidewall engagement by said conductive electrode when said stylus tip is received in said disc groove;

the substantially constant configuration of said disc groove sidewalls limiting the depth of stylus tip reception in said groove to a magnitude which is the same for all regions of said groove throughout said successive convolutions and which is independent of the contents of said information track;

said groove bottom geometry variations in the groove of said thermoplastic disc comprising variations in the depth of said groove in a region centrally disposed relative of said sidewalls, said depth variations being limited to a range of depths exceeding said limited magnitude of depth of stylus tip reception;

a turntable for supporting said disc in a playing position permitting said disc groove reception of said stylus tip;

means for rotating said turntable for establishment of relative motion between disc groove and stylus tip;

and means, including a conductor connected to said stylus electrode, for developing an electrical signal representative of said recorded information when said relative motion occurs.

19. In combination:

a disc of thermoplastic material;

said disc having, in a surface thereof, a spiral groove of a width which is substantially constant and independent of recorded information, the center-to-center spacing of successive convolutions of said spiral groove being independent of recorded information;

said groove containing an information track constituted by variations in the geometry of the bottom of the groove representative of video signal information, and having sidewalls of a configuration which is substantially constant throughout said successive convolutions and independent of the groove bottom geometry variations, said groove bottom geometry variations comprising variations in the depth of said groove in a region centrally disposed relative to said groove sidewalls;

a stylus having a tip subject to reception in said disc groove;

said stylus tip having insulating sidewalls for disc groove sidewall engagement when said tip is received in said disc groove, said insulating sidewalls being constituted by opposite edges of a support element of insulating material, and a conductive electrode, supported by said insulating support element, and having a surface exposed at the bottom of said stylus tip, a turntable for supporting said disc in a playing position permitting said disc groove reception of said stylus tip;

means for rotating said turntable for establishment of relative motion between disc groove and stylus tip;

and means conductively connected to said stylus electrode for developing an electrical signal representative of said recorded information when said relative motion occurs.

20. Playback apparatus, for use with a grooved video disc, comprising the combination of:

a stylus having a tip subject to reception in the groove of a video disc;

said stylus including a support of insulating material providing the tip of said stylus with insulating sidewalls, the spacing therebetween being such as to permit disc groove sidewall engagement by said insulating sidewalls in said playback use;

said stylus tip also including a conductive electrode, secured to said insulating support, said electrode presenting a surface to the disc groove bottom when said tip is received in said disc groove, which surface has a greater dimension in a lateral direction extending between said stylus sidewalls and a lesser dimension in a direction transverse to said lateral direction, said lesser dimension being approximately 1 micrometer;

a turntable for supporting a video disc in a playing position permitting disc groove reception of said stylus tip;

means for rotating said turntable for establishment of relative motion between disc groove and stylus tip;

and means conductively connected to said stylus electrode for developing an electrical signal representative of information recorded on said video disc when said relative motion occurs.

* * * * *